United States Patent [19]
Selch

[11] 3,899,955
[45] Aug. 19, 1975

[54] MACHINE TOOL CONSTRUCTION

[75] Inventor: Howard I. Selch, Canal Fulton, Ohio

[73] Assignees: James I. Selch, Canal Fulton, Ohio; Joseph J. Mullane, Denver, Colo.; T. D. Copeland, Garland, Tex. ; part interest to each

[22] Filed: Feb. 22, 1974

[21] Appl. No.: 444,861

Related U.S. Application Data

[62] Division of Ser. No. 135,706, April 20, 1971, Pat. No. 3,799,026.

[52] U.S. Cl.............. 90/11 A; 90/20.5; 29/103 R; 83/665; 83/698; 403/334
[51] Int. Cl.$^2$............................................ B23C 5/26
[58] Field of Search.............. 90/11 A, 11 B, 20.5; 85/33, 51; 29/103, 104; 403/344; 83/665, 664

[56] References Cited
UNITED STATES PATENTS

| | | | |
|---|---|---|---|
| 358,550 | 3/1887 | Harvey | 83/425.3 |
| 774,155 | 11/1904 | Butterfield | 403/344 |
| 822,591 | 6/1906 | Dowding | 29/103 |
| 857,862 | 6/1907 | Best | 403/344 |
| 1,453,470 | 5/1923 | Lees | 90/20.5 |
| 1,939,246 | 12/1933 | Antonsen | 83/664 X |
| 2,551,049 | 5/1951 | Pinkers | 29/104 |
| 2,613,571 | 10/1952 | Herman | 83/664 |

*Primary Examiner*—Gil Weidenfeld

[57] ABSTRACT

An arbor arrangement for machine tools wherein the cutting tool is located between two bearing supports and may be replaced without disconnecting the shaft from either bearing. The cutter is made in two mating parts and assembled on the arbor shaft by split stop nuts and/or split stop spacers.

4 Claims, 14 Drawing Figures

3,899,955
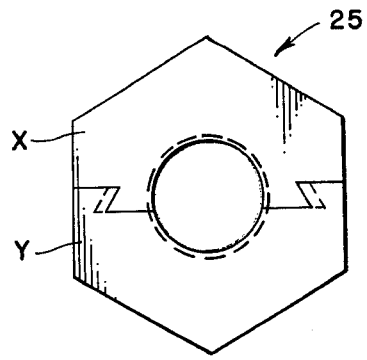
FIG. 3
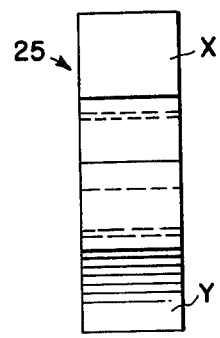
FIG. 4
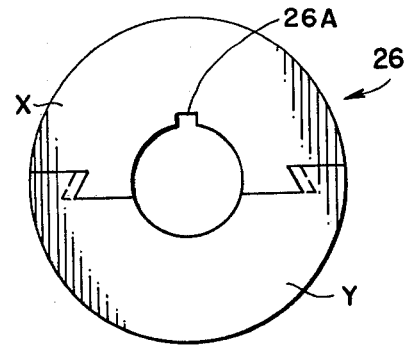
FIG. 7
FIG. 5
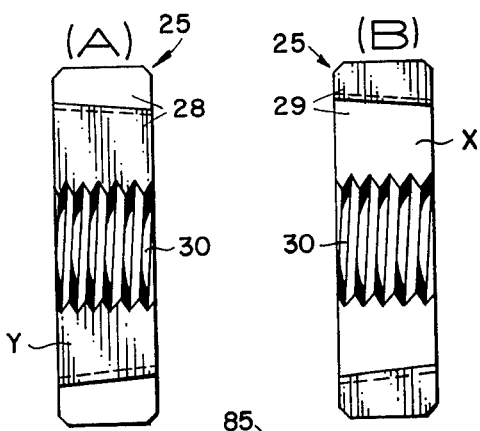
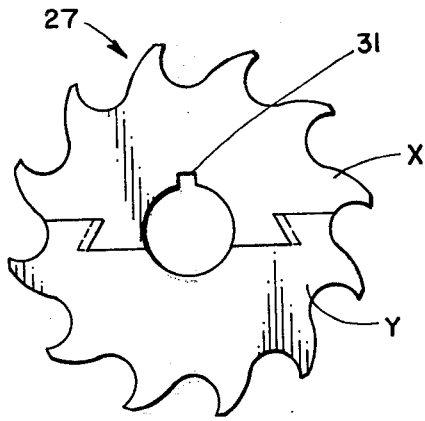
FIG. 6
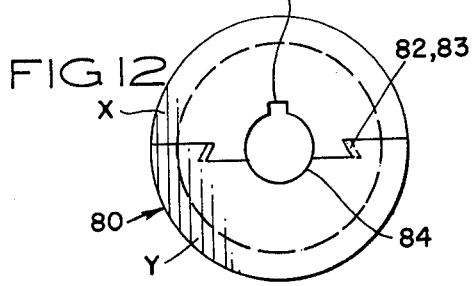
FIG 12
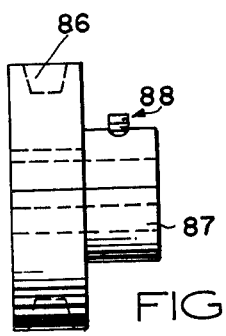
FIG. 13
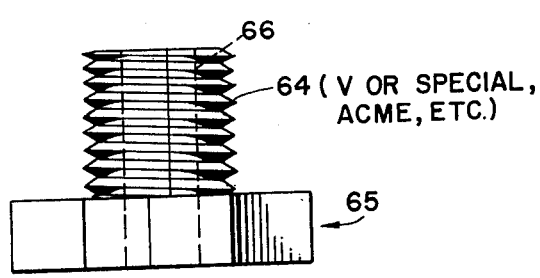
FIG. 11
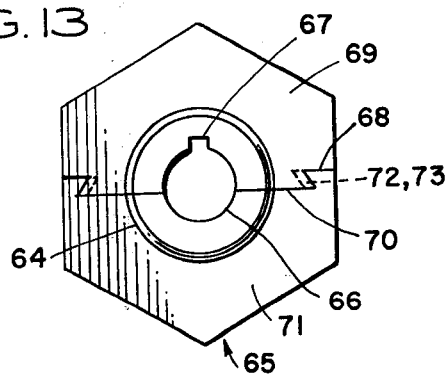
FIG. 10

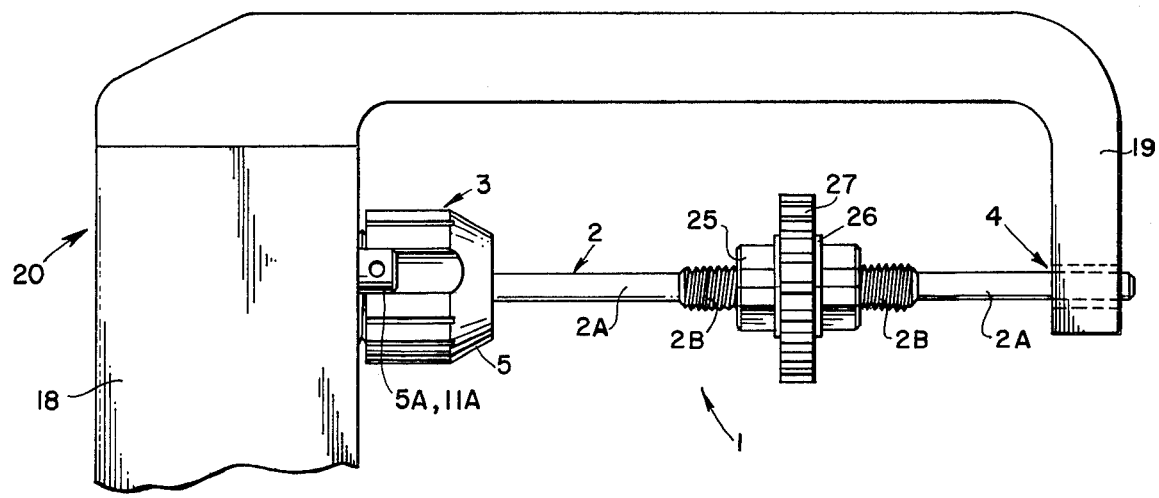
FIG. 1
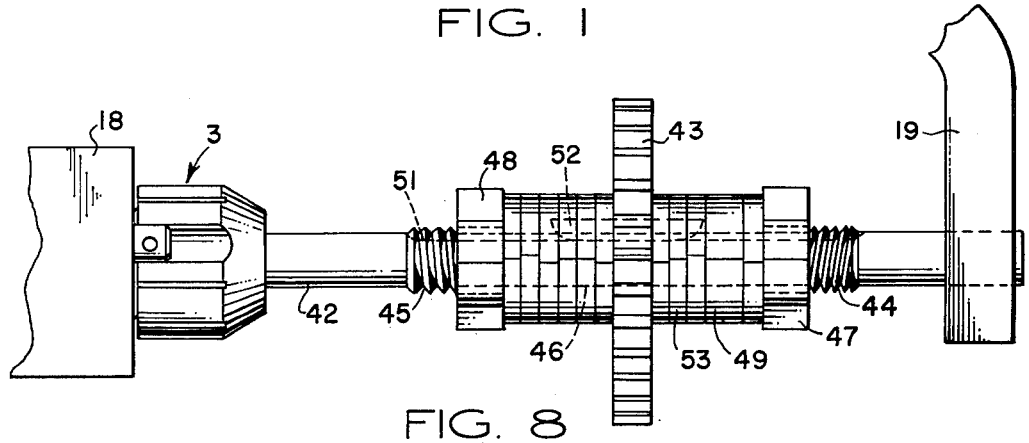
FIG. 8
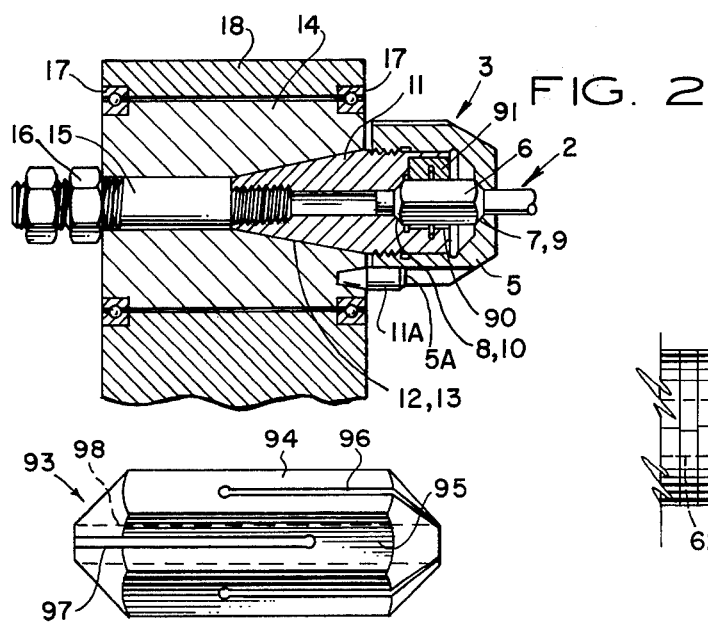
FIG. 2
FIG. 14
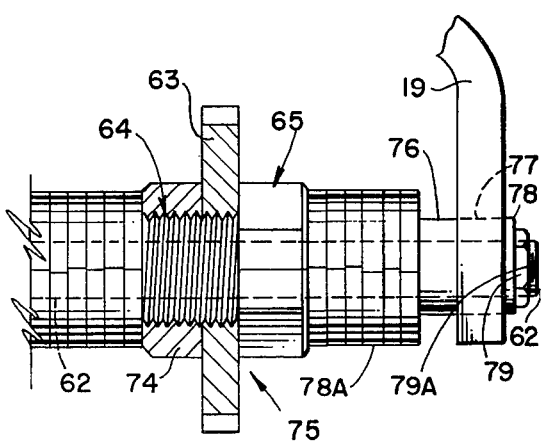
FIG. 9

MACHINE TOOL CONSTRUCTION

This is a division of Application Ser. No. 135,706, filed Apr. 20, 1971, now Pat. No. 3,799,026.

BACKGROUND OF THE INVENTION

1. Field of Invention

This invention relates to the field of machine tools, such as milling machines and to methods and structure for holding and replacing cutting tools therefor.

2. Description of the Prior Art

Previous arbor arrangements for the desired machine tool use employ an arbor shaft coupled to and supported at one end to a power drive spindle, and supported at the other end in a bearing structure. To this extent, the prior art arbor arrangements are similar to the present invention. However, the prior art arbor shaft is in general a smooth shaft with an elongated keyway and the cutter wheel is attached to the shaft with a key and held against longitudinal movement by a series of spacers between the drive spindle and the cutter on one side and between the cutter and the outer bearing on the other side. When it was desired to replace the cutter, all of the spacers were removed between it and the free end of the shaft. This requirement necessitated disconnecting one or both ends of the arbor shaft, and was a very time consuming process.

Examples of prior art patents for related components are U.S. Pat. Nos. 1,794,361 to Armitage, et al, for Milling Machine spindle & Tool, and 3,115,065 to S. M. Kulusic for Master Arbor for Milling Machines, and 2,664,023 to R. Mugford for Snap-On Split Nut and 3,343,440 to Jones, et al, for Self-Locking Two Piece Fastening Device. Substantial distinctions, however, will be noted both in the individual components and in the combination as claimed herein.

SUMMARY OF THE INVENTION

The arbor shaft of the present invention is engaged into the machine tool drive spindle at one end by a special centering and aligning and locking mechanism and is supported at its outer end in a conventional manner. The arbor shaft of one embodiment of this invention is threaded over a limited portion intermediate the two ends and employs the customary key way between the cutter and the shaft.

A unique arrangement is seen in the manner in which the cutter wheel and its spacers and locking nuts are put onto the arbor shaft. All of these parts are separable in structure and can be installed on the arbor shaft without disturbing the arbor shaft supports at either end.

The present invention thus greatly expedites cutter replacement and reduces "down-time" which is unproductive and expensive.

It is therefore an object of this invention to provide an arbor arrangement for machine tools which will securely support and accurately rotate a cutter tool and which will also permit rapid removal and replacement when compared with prior art arrangements.

It is also an object of this invention to provide a cutter wheel which is separable into two half units for reassembly and locking into place on an arbor shaft while the shaft remains supported at both ends.

It is a further object to provide a partially threaded arbor shaft that is supported at both ends and on which may be installed a threaded cutter and threaded locking nuts without disturbing the end supports.

A still further object is to provide a threaded split stop nut that can be assembled around a shaft and engage threads thereon and which upon engaging the threads will not accidently separate into its separable halves.

DESCRIPTION OF THE DRAWINGS

FIG. 1 is a side elevational view of an arbor arrangement of this invention.

FIG. 2 is a detail cross sectional view of the drive spindle mounting for the shaft of the arbor arrangement of FIG. 1.

FIG. 3 is a plan view of the split stop nut of this invention that secures a cutting tool onto the shaft of the arbor of FIG. 1.

FIG. 4 is a side elevational view of the nut of FIG. 3.

FIG. 5 is a view of the two separable halves of the nut of FIGS. 3 & 4.

FIG. 6 is a plan view of a split stop cutting wheel using a technique of this invention as seen in FIGS. 3-5.

FIG. 7 is a plan view of a split stop spacer or washer for use on the arbor of FIGS. 8 & 9.

FIG. 8 is a modified embodiment of the arrangement shown in FIG. 1, wherein spaced portions only of the arbor shaft are threaded.

FIG. 9 is a modified embodiment of the device of FIG. 1, wherein the mounting arrangement of the tool of this invention may be used on a conventional unthreaded arbor shaft.

FIG. 10 is a detail plan view of the mounting plug of FIG. 9.

FIG. 11 is a detail elevational view of the mounting plug of FIGS. 9 & 10.

FIG. 12 is a plan view of the pulley of this invention.

FIG. 13 is a side elevational view of the wheel or pulley of FIG. 12.

FIG. 14 is a side elevational view of a collett adapter for a modified shaft embodiment of this invention.

DESCRIPTION OF PREFERRED EMBODIMENTS

Referring now to the disclosures shown in the drawings, it will be seen in FIG. 1 that the arbor arrangement 1 of this invention comprises an arbor shaft 2 supported at one end in a chuck or coupling 3 and at the other end in bushing 4. The coupling 3 is seen in more detail in FIG. 2, wherein cup 5 surrounds the shaft 2 and bindingly engages its enlarged hexagon end 6 and causes the conical end portions 7 & 8 to seat in corresponding tapers 9 & 10 in the cap 5 and arbor head 11 respectfully. The arbor head 11 is conically tapered at 12 and engages a corresponding taper 13 in the drive spindle 14. The arbor head 11 and its extending shaft 15 together with lock nut 16 holds the shaft 2, the assembled coupling 3, and the arbor head 11 into compact driving relation with drive spindle 14. The spindle 14 is mounted in bearings 17 in the frame 18 of milling machine 20 with which the tool and arbor arrangement of this invention may be employed. The distal end of arbor shaft 2 is supported in bearing 4 from the overarm portion 19 of the milling machine identified generally as 20. To prevent slippage between the drive spindle 14 and arbor head 11, the cap 5 contains slots 5A to receive dogs 14A removably attached to spindle 14 and projecting outwardly therefrom.

The arbor arrangement of the prior art employed a straight unthreaded shaft and a keyway for attaching the cutter wheel to the shaft and a series of spacers to locate & lock the cutter wheel in place along the shaft. To change a tool of this type, the shaft would need to be detached from its support in the frame of the machine tool. This was so because the cutter was a rigid wheel with a center bore in an otherwise solid wheel. With the present invention, however, both ends of shaft 2 remain in place, and the cutter wheel, spacer and nut are removed from the shaft and then a new cutter installed on the shaft, with virtually no "down-time."

The nuts, spacers and cutter wheel (or cutter) identified at 25, 26 and 27 respectively in FIGS. 3–7 are all constructed similarly so that each has two separable halves as shown at x & y in the drawing. The two halves x & y of nut 25 are cast or formed as two separate units as shown in FIG. 5. The halves may be formed by powder metallurgy or cast or otherwise formed with a straight center bore, having no threads at the end of the forming operation. The mating tapers or guideways 28 & 29 are then machined to a precision finish, and the halves are engaged by these mating tapers. When so engaged the two halves are locked in place and positively cannot be moved in a direction to further engage the tapers. When thus assembled, the now completed nut may be threaded with conventional threading tools or taps to produce threads 30. The cutter wheel 27 is made by this same technique, but the spacers 26 are not necessarily threaded in their construction. The cutter wheel 27 includes a keyway 31 to permit it to be locked to the arbor shaft 2 by a corresponding keyway therein that receives a key (not shown in FIG. 1) common to the cutter and shaft.

The milling machine shown in FIG. 1 utilizes the driving and holding arrangement shown in FIG. 2, although any suitable arrangement may be used. The drive spindle 14 may be motor driven through a gear train (not shown) or may be driven from a flat belt or V belt drive, in which event a split stop pulley of the type shown in FIGS. 12 & 13 may be employed to advantage since pulley shafts are also anchored at both ends in bearing supports. The threaded cutter wheel 27 of FIG. 1 is positioned along the arbor shaft 2 to the desired longitudinal location and its keyway aligned with the shaft keyway and a locking key inserted in the matching keyways. Next the split stop spacers, or washers 26 may be assembled over the reduced diameter portion of the shaft 2A and moved longitudinally along the shaft and over the threaded portion 2B of the shaft until they abut the lateral faces of cutter wheel 27. The I.D. of the washers 26 corresponds to the O.D. of the threaded portion 2B so that a close tolerance fit will result. Or alternately, the I.D. of washer 26 may be threaded, in which case the key holding cutter 27 is shortened to be contained entirely within the width of the cutter, and the keyway indicated at 26A on washer 26 would be eliminated. Next in sequence, the halves 25A & 25B of each split stop nut are assembled over the unthreaded portion 2A of the arbor shaft and then threaded along the length of threaded portion 2B until they engage and tighten against washers 26. In the event any additional locking force were needed, it would be needed only on the nut which could be backed off by rotation of the cutter tool wheel. For instance, if the cutter rotation was counterclockwise (when viewed from the right side of FIG. 1, and the right side nut and portion 2B employed left hand threads so that it also rotated counterclockwise to "make up" or tighten against the washer 26, then it would not be subject to any force to cause it to "back off" of its shaft engagement. Therefore only the nut 25 would need to be locked, as by a set screw in the nut that aligned with the keyway extending the full length of the threaded portion 2B.

The embodiment shown in FIG. 8 is seen to employ the same type of arbor shaft to drive coupling 3 as the previous embodiment. It also includes a similar support in overarm 19 for the outer end of arbor shaft 42. The cutter wheel 43 for this embodiment has a smooth bore whose I.D. provides a close tolerance fit onto the O.D. of shaft 43. Only short sections 44 & 45 on the raised diameter portion 46 of shaft 42 are threaded, and the sections 44 & 45 contain opposite hand threads. The benefit of this construction is that for a given cutter wheel rotation, neither of the nuts 47 or 48 can accidently work out of binding engagement with the spacers 49 & cutter 43, because the more the tendency of cutter 43 to move the nut, the tighter the nuts will bind against the spacers and cutter. In this embodiment the keyway 51 extends the full length of the raised portion 46 of shaft 42, and the key 52 may terminate within the cutter width or may extend a distance beyond the cutter 43. Hence if the cutter 43 was found to be slightly too far to the left on shaft 42. the nuts 47 & 48 would be loosened enough to remove one of the thin washers 53 at the right of the cutter and the cutter slid along the key to the right and washer 53 then installed on the left side and all the parts retightened.

In the embodiment shown in FIG. 9, the arbor shaft 62 has a smooth, constant diameter O.D., and corresponds to arbor shafts of the prior art and of the type now in use generally throughout the industry. The cutter wheel 63 has a threaded I.D. to correspond to the O.D. of threads 64 of the split stop plug 65, also shown in FIGS. 10 & 11. The smooth I.D. 66 of plug 65 includes a keyway 67 to receive a key (not shown) to prevent rotation of the plug 65 and cutter 63 relative to shaft 62. The plug itself is split as shown by dividing line 68 on top half 69 and dividing line 70 on bottom half 71, each dividing line 68 & 70 includes matched tapers 72 & 73. Once the cutter 63 and plug 65 are moved to the desired longitudinal location on shaft 62, the split stop locking nut 74 is installed around shaft 62 and threadedly engaged with threads 64 of plug 65 and made up until it locks cutter 63 in place between the plug and nut. Next, the split stop washers and spacers are assembled onto the shaft until they abut against each side of the plug-cutter-nut combination 75. A slight adjustment can be made by sliding the combination along the key. Once all of the spacers are installed on both sides of the combination, a sleeve bushing 76 engages the last spacer to the left on shaft 62 and extends through the bore 77 of overarm 19. A solid or lock washer 78 abuts the end of bushing 76 and surrounds the end threads 79 of shaft 62 which is engaged by nut 79 to lock all of the elements installed on shaft 62 into a compact assembly.

The "Split stop" designation used to describe all of the separable parts shown in FIGS. 3–13 simply means that the finished part is made in two sections and that the dividing surfaces engage and move together a certain distance and stop exactly at the desired location. When this stop occurs, the complete article functions as a precision machine tool part until it is desired to separate it again into its two components.

The pulley or wheel 80 shown in detail in FIGS. 12 & 13 comprises two halves x & y having matched engaging tapers 82 & 83 and having a smooth bore 84 with keyway 85. The pulley is shown for a flat belt with an alternate showing of grooves 86 suitable for a V-belt, but the circumference could also include a rubber or pliable surface or a tire or have any other contour to receive a belt of the desired design or to roll on a continuous surface. Pulley 80 also includes an outwardly extending boss 87 with a set screw 88 located in its upper half. When the pulley is assembled and located on its shaft, the single set screw 88 is tightened against the shaft (or keyway) and both halves of the pulley are automatically locked on the shaft since the lower half cannot move against the internal stop formed when the tapers are engaged.

The head or chuck holder 11 of FIG. 2 includes a hexagonal (or other polygon shape) recess 90 to receive the hex end 6 of shaft 2. Three of the sides of this recess are rigid and three are floating, as at 91, to insure a constant drive on at least three to six sides, all as described in my patent No. 2,833,547, issued May 6, 1958, for "Drilling or Like Rotary Cutting Tool."

The shafts 2 (42 or 62), as seen in FIG. 2 may be a continuous straight (constant diameter) shaft at their inboard end without an integral hex 6, if the collett 93 shown in FIG. 14 is employed. This collett is made from hexagonal (or suitable polygon) stock having six faces 94 & 95, so that it is firmly held in the hexagonal socket of coupling 3 and is tightened into place against tapered seats 9 & 10 when cap 5 is made up. The slits 96 in faces 94 and slits 97 in the faces 95 will contract slightly under compression from cap 5 and thereby firmly grip the shaft and prevent its movement relative to head 11. This unique collett structure may be made of ferrous or non-ferrous metals or of any other suitable material, such as plastics (Teflon, Lexan, PVC, etc.). The I.D. 98 of this collett may be roughened, or coarse cut to provide improved gripping surface.

It is to be understood that the above described embodiments are simply illustrative of the principles of the invention. Numerous other modifications may be devised without departing from the spirit and scope of the invention.

What is claimed is:

1. In a machine tool comprising:

a drive shaft being partially threaded and having a reduced diameter at the ends thereof and said ends being received in support bearings for rotation of said shaft;

cutter wheel means having a circular central bore for being received on said drive shaft, means between the cutter wheel means and the shaft to prevent relative rotation therebetween;

spacer means having a smooth central bore and located on said shaft at each side of said cutter wheel means;

nut means threadingly received on threaded portions of said shaft for tightening said spacer means against the cutter wheel to secure said cutter wheel means at a selected axial location on said shaft;

each of said cutter wheel means, spacer means and nut means comprising a pair of separable members located on opposite sides of the drive shaft, each pair of said separable members having interengaging means for connecting and disconnecting said members from each other by relative lateral movement, whereby the cutter wheel means, spacer means and nut means are mountable on said drive shaft for a cutting operation without removal of said drive shaft from said support bearings.

2. The machine tool as claimed in claim 1, wherein said interengaging means include complementary dove-tailed tapered surfaces.

3. The machine tool as claimed in claim 1, wherein the bore of said cutter wheel means has a smooth surface and is located on an unthreaded portion of the shaft, and said spacer means being located on threaded and unthreaded portions of the shaft.

4. In a machine tool comprising:

a drive shaft having a smooth surface and having its ends received in support bearings for rotation of said shaft;

cutter wheel means having a threaded circular bore;

plug means having a smooth bore for being received on said drive shaft, said plug means having an externally threaded surface and a radially extending shoulder at one end thereof adjacent said threaded surface;

means between the plug means and the shaft to prevent relative rotation therebetween;

said cutter wheel means being threadingly received on said plug means;

nut means threadingly received on said plug means for securing said cutter wheel means against the radial shoulder on said plug means;

means for positioning said plug means at a selected axial location on said shaft;

each of said cutter wheel means, plug means and nut means comprising a pair of separable members located on opposite sides of the drive shaft, each pair of said separable members having interengaging means for connecting and disconnecting said members from each other by relative lateral movement, whereby the cutter wheel means, plug means and nut means are mountable on said drive shaft for a cutting operation without removal of said shaft from said support bearings.

* * * * *